Feb. 9, 1954     T. H. BENZINGER ET AL     2,668,471
CONTINUOUS RECORD OF INTERFEROMETRIC GAS ANALYSIS
Filed Sept. 3, 1952
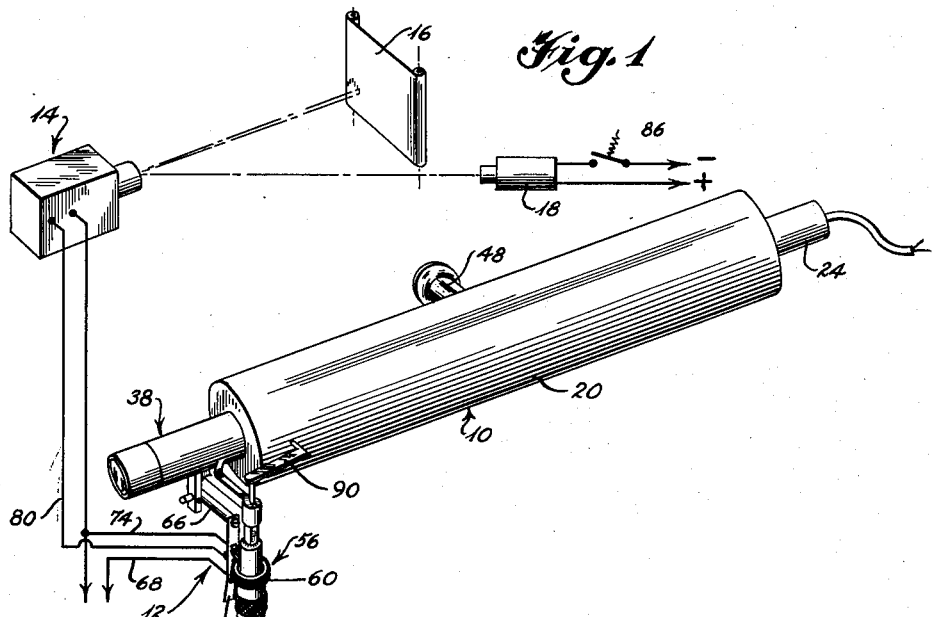
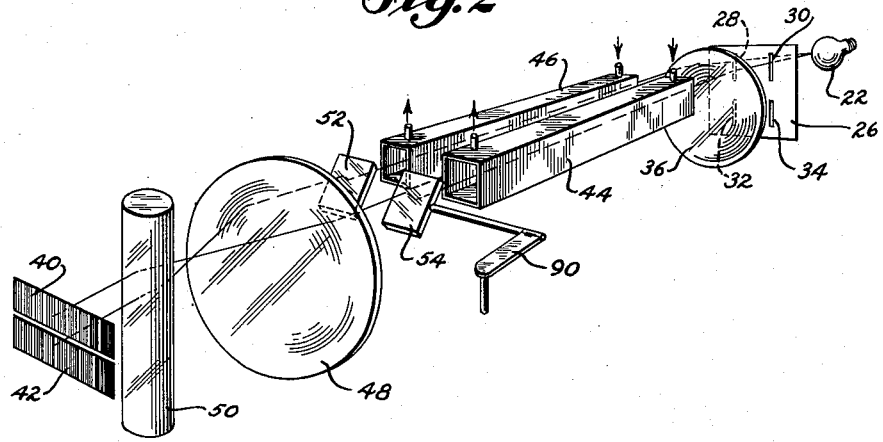
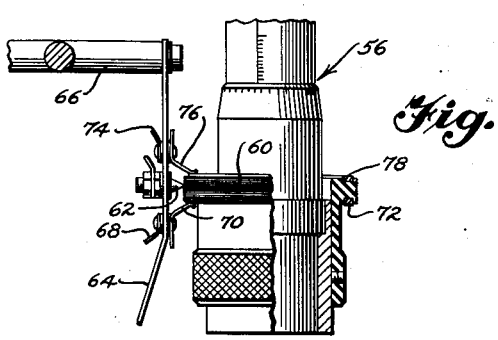
INVENTORS
Theodor H. Benzinger and
BY Charlotte Kitzinger

Patented Feb. 9, 1954

2,668,471

UNITED STATES PATENT OFFICE 2,668,471

CONTINUOUS RECORD OF INTERFEROMETRIC GAS ANALYSIS

Theodor Hannes Benzinger, Rockville, and Charlotte Kitzinger, Bethesda, Md.

Application September 3, 1952, Serial No. 307,731

3 Claims. (Cl. 88—14)

(Granted under Title 35, U. S. Code (1952), sec. 266)

This invention relates to improvements in equipment used for recording data concerning interferometric gas analysis.

An object of the invention is to provide an apparatus for, and teach a method of obtaining accurate information of the composition of gas exhaled by a person, the information being obtained easily and recorded on a sheet in graph form, whereby the graph may be studied and interpreted after a complete or partial test has been run.

A simplified structure is described, which is capable of measuring the oxygen and carbon dioxide content of flowing respiratory gases by the optical interference method. The measurements are recorded continuously, preferably photographically. The method described herein may be practiced by the simplified structure, or other structures which may be substituted for those illustrated as will become apparent to those skilled in the art, and various steps may be carried out by hand.

Other objects and features of importance will become apparent in the following description.

In the drawing:

Fig. 1 is a perspective view of one form of the invention, portions being shown schematically.

Fig. 2 is a schematic view, shown in perspective, of the components used for producing the spectra employed in the operation of the gas analysis system.

Fig. 3 is a fragmentary elevational view with parts broken away in section, of a screw assembly used in the gas analysis system.

In Fig. 1 there is a structural assembly including an interferometer 10, a potentiometer 12, a light reflecting galvanometer 14, and a continuously operable, reel supported, movable photosensitive sheet 16. These components, together with a light source 18, directed toward the galvanometer 14 constitute the main structures of the assembly.

The interferometer 10 includes a housing 20, at one end of which there is a light source 22 in a suitable socket and casing 24. A panel 26 is disposed in the housing 10, and is provided with upper slits 28 and 30, together with lower slits 32 and 34. Lens 36 is disposed on one side of the slits, while the light source 22 is located on the opposite side of the slits, whereby the light rays passing through the slits are properly directed in the housing 20, toward the eye piece lens unit 38 in which the spectra 40 and 42 respectively, are visible. Gas tubes 44 and 46 are provided in alignment with the rays passing through the lens 36, and there are lenses 48 and 50 between the tubes 44 and 46, and the eye piece unit 38.

With the above described arrangement of lenses, slits and light source, the spectra 40 and 42 are produced, one above the other. When respiratory gas is passed through tube 44 by breathing into the inlet member 48, and a comparative gas is provided in absorption tube 46, and both gases have identical optical interference, the maxima and minima of the interference spectrum projected through the gases correspond exactly to those of the comparative spectrum 42. On the other, each variation in refraction shifts the maxima and minima of the spectrum 40. By interposing a medium with strong optical refraction and variable thickness into the path of the beam, an exact correspondence between the two spectra can be reestablished. This is done by placing plano-parallel glass plates 52 and 54 respectively in the path of each beam of light. The thickness of the plate 54 relative to the light ray can be changed by slanting it. The degree to which the plate 54 is turned has a definite, almost linear, relation to the difference in refraction of the two gases and, consequently, to the difference in their composition. The amount of rotation of plate 54 will therefore provide information of gas composition and is read on the micrometer 56 to which the potentiometer is operatively connected.

As seen best in Figs. 1 and 3, the potentiometer 12 includes a winding 60 on a part of the micrometer 56, the winding having a sliding contact 62 touching it and carried by an arm 64 which is carried by a support bracket 66. From an electrical supply, wire 68 is secured to flexible brush 70 that rests against the ring 72, connected to one end of winding 60, and wire 74 is secured to flexible brush 76 that rests against the ring 78, connected to the opposite end of winding 60; both flexible contacts being secured to the arm 64. Wire 80 is fastened at one end to the sliding contact 62, and at the opposite end to the galvanometer 14, wire 74 also extending to the galvanometer to energize it. Since the galvanometer 14 is of the string reflecting type, the voltage applied thereto, which varies in response to the setting of the micrometer, shifts the reflecting surface thereof amounts which are functions of the position of glass plate 54. As previously pointed out, the operator of the assembly moves the plate 54 until the spectra 40 and 42 are vertically aligned, and the offset positions of the spectra are caused by deviation of respiratory air composition from that of the standard in tube 46.

The light source 18 is directed toward the reflecting surface of the galvanometer 14, and the reflection from the galvanometer impinges upon the light sensitive sheet 16, the latter being mounted for movement at a predetermined rate on reels which are suitably actuated. A switch 86 which may be foot or hand operated, is used to control the energization of the light source 18.

In operation of the illustrated assembly which is but one manner of practicing the method, a patient breathes into the inlet 48, the respiratory air circulating through the tube 44. The tube 46 is provided with absorption media such as 30% granulated soda lime with 40% potassium hydroxide in bars and 30% granulated calcium chloride, the order depending on the direction of comparative gas flow through tube 46. The comparative gas being pumped through the absorption tube 46, together with the respiratory air flowing through tube 44 causes the spectrum 40, while the comparative spectrum is produced by light rays passing through the lenses and slits 32 and 34.

The operator sees the spectra in the eye piece unit 38 and aligns them by rotating the screw of the micrometer, that moves crank 90 to which plate 54 is fastened. At the same time the potentiometer 12 is adjusted to apply a larger or smaller voltage to the galvanometer 14, depending upon the directions of rotation of the micrometer screw. When the spectra are aligned vertically, the operator closes the spring opened switch 86 causing a pulse of light to be deflected off the reflecting surface of the galvanometer 14, whence it impinges upon the sheet 16, producing a mark thereon. As the gas composition changes in tube 44, the spectrum 40 will have to be shifted and another mark made on the sheet 16 by another operation of the switch 86. Since the spectrum shift may be accomplished rapidly, markings on the sheet may be made continually while the patient breathes normally, or abnormally, into the inlet 48. The comparative gas used in absorption tube 46 is of known composition and hence, the marking of sheet 16 may show in form any component of respiratory gas, such as oxygen or carbon dioxide.

It is apparent that various modifications may be made without departing from the scope of the following claims.

The invention described herein may be manufactured and used by or for the Government of the United States of America for governmental purposes without the payment of any royalties thereon or therefor.

What is claimed is:

1. In an assembly for continuous recordation of gas analysis, said assembly including an interferometer provided with means for producing a comparative spectrum, means responsive to the refraction of the gas being tested for producing a movable spectrum, and means for moving the latter spectrum relative to the comparative spectrum; the improvement comprising a screw arranged to actuate said moving means, a recording device, and means operatively connected with said screw for marking on said recording device in response to the position of said screw.

2. In an assembly for continuous recordation of gas analysis, said assembly including an interferometer provided with means for producing a comparative spectrum, means responsive to the refraction of the gas being tested for producing a movable spectrum, and means for moving the latter spectrum relative to the comparative spectrum; the improvement comprising a screw arranged to actuate said moving means, a recording device including a movable photosensitive sheet, a light reflecting galvanometer directed toward said sheet, a light source directed toward said light reflecting galvanometer, and means responsive to movement of said screw for shifting the direction of light reflection from said galvanometer.

3. In an assembly for continuous recordation of gas analysis, said assembly including an interferometer provided with means for producing a comparative spectrum, means responsive to the refraction of the gas being tested for producing a movable spectrum, and means for moving the latter spectrum relative to the comparative spectrum; the improvement comprising a screw arranged to actuate said moving means, a recording device including a movable photo-sensitive sheet, a light reflecting galvanometer directed toward said sheet, a light source directed toward said light reflecting galvanometer, means responsive to movement of said screw for shifting the direction of light reflection from said galvanometer, and a manually operative switch arranged to control said light source for controlling the markings of said sensitive sheet.

THEODOR HANNES BENZINGER.
CHARLOTTE KITZINGER.

References Cited in the file of this patent

UNITED STATES PATENTS

| Number | Name | Date |
|---|---|---|
| 1,758,088 | Schmick | May 13, 1930 |
| 1,770,355 | Doi | July 8, 1930 |
| 2,333,762 | Bertrand | Nov. 9, 1943 |
| 2,395,489 | Major et al. | Feb. 26, 1946 |
| 2,407,838 | Kliever | Sept. 17, 1946 |

FOREIGN PATENTS

| Number | Country | Date |
|---|---|---|
| 577,377 | Germany | July 12, 1933 |